_(12)_ United States Patent
Kiryu et al.

(10) Patent No.: US 8,406,829 B2
(45) Date of Patent: Mar. 26, 2013

(54) SLIDE HINGE AND PORTABLE ELECTRONIC DEVICE

(75) Inventors: Koichi Kiryu, Shimotakai-gun (JP); Koki Sato, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 251 days.

(21) Appl. No.: 12/787,529

(22) Filed: May 26, 2010

(65) Prior Publication Data

US 2010/0323772 A1 Dec. 23, 2010

(30) Foreign Application Priority Data

Jun. 22, 2009 (JP) ................................. 2009-147694

(51) Int. Cl.
*H04M 1/00* (2006.01)
(52) U.S. Cl. .................................... 455/575.4; 455/90.3
(58) Field of Classification Search ............... 455/575.4, 455/575.1, 90.3
See application file for complete search history.

(56) References Cited

U.S. PATENT DOCUMENTS

| | | | | |
|---|---|---|---|---|
| 5,779,496 A | * | 7/1998 | Bolinger et al. | 439/377 |
| 5,872,699 A | * | 2/1999 | Nishii et al. | 361/699 |
| 6,438,228 B1 | * | 8/2002 | Jeong et al. | 379/433.13 |
| 6,961,593 B1 | * | 11/2005 | Lonka et al. | 455/573 |
| 7,369,882 B2 | * | 5/2008 | Hwang et al. | 455/575.1 |
| 7,752,710 B2 | * | 7/2010 | Lin | 16/334 |
| 8,032,192 B2 | * | 10/2011 | Park | 455/575.4 |
| 8,180,418 B2 | * | 5/2012 | Nakazawa | 455/575.4 |

FOREIGN PATENT DOCUMENTS

JP 2009-077001 4/2009

* cited by examiner

*Primary Examiner* — Temica M Beamer
(74) *Attorney, Agent, or Firm* — IPUSA, PLLC

(57) ABSTRACT

A slide hinge includes a first member; a second member connected to the first member, the second member being configured to slide between a first position and a second position; a first terminal part supported at a first member side; and a second terminal part supported at a second member side. By sliding the second member to the first position relative to the first member, the first terminal part and the second terminal part are made conductive with each other.

13 Claims, 12 Drawing Sheets

SLIDE HINGE AND PORTABLE ELECTRONIC DEVICE

CROSS-REFERENCE TO RELATED APPLICATIONS

This patent application is based upon and claims the benefit of priority of Japanese Patent Application No. 2009-147694 filed on Jun. 22, 2009 the entire contents of which are incorporated herein by reference.

BACKGROUND OF THE INVENTION

1. Field of the Invention

The present invention generally relates to slide hinges and portable electronic devices.

2. Description of the Related Art

A portable electronic device has a structure where, for example, a first housing having input keys and other parts is connected to a second housing having a display part and other parts. The second housing can be opened and closed relative to the first housing, so that an error operation of an input key can be prevented and the display part can be protected.

As a connecting mechanism, for example, there is a mechanism where the first housing and the second housing are rotatably connected to each other or a mechanism where the first housing and the second housing are slidably connected to each other.

A slide type connecting mechanism (a slide hinge) includes, for example, a first member provided at a first housing side, a second member provided at a second housing side, and a guide member configured to slidably connect the first member and the second member to each other. When the second member is slid to an opening position relative to the first member, for example, the input keys and other parts of the first housing are exposed.

Recently, in the slide type mobile electronic device, a structure where various functions are controlled based on a detecting result of a position detecting switch configured to detect a position of the second housing relative to the first housing has been suggested. See, for example, Japanese Laid-Open Patent Application Publication No. 2009-077001.

As the position detecting switch, a Hall element or a pushing switch is used. In a case where the Hall element is used, for example, a magnet is provided at the first housing side and the Hall element is provided at the second housing side. In a case where the pushing switch is used, for example, a convex part is provided at the first housing side and the pushing switch is provided at the second housing side.

However, in the case where the Hall element is used, it is necessary to always supply electric power to the Hall element. In addition, in the case where the pushing switch is used, the convex part is provided at the first housing side and a pair of terminal parts facing each other is provided at the second housing side and therefore the number of components is increased. Thus, in the conventional position detecting switch, there is a problem of the amount of electric power consumed or the number of the components.

In the meantime, it is a general practice that a first circuit board is provided in the first housing and a second circuit board is provided in the second housing. From the view point of stability of a standard electrical potential or noise control of the first circuit board (second circuit board), it is critical that a ground pattern of the first circuit board (second circuit board) and a ground frame of the first housing side (second housing side) be connected to each other. As the ground frame of the first housing side (second housing side), a first member (second member) which is conductive can be used.

However, in the conventional slide hinge, an insulation guide member made of resin such as POM (polyacetal) is provided between the first member and the second member in order to ease an impact or reduce noise at the time of sliding. Because of this, an electrical potential difference may be generated between the ground frames.

SUMMARY OF THE INVENTION

Accordingly, embodiments of the present invention may provide a novel and useful slide hinge and portable electronic device solving one or more of the problems discussed above.

More specifically, the embodiments of the present invention may provide a slide hinge, including:

a first member;

a second member connected to the first member, the second member being configured to slide between a first position and a second position;

a first terminal part supported at a first member side; and a second terminal part supported at a second member side;

wherein, by sliding the second member to the first position relative to the first member, the first terminal part and the second terminal part are made conductive with each other.

Another aspect of the embodiments of the present invention may be to provide a portable electronic device, including:

a first housing;

a second housing;

a slide hinge connecting the first housing to the second housing so that the second housing can be slid between a first position and a second position; and a position detecting switch configured to detect a position of the second housing relative to the first housing, wherein the position detecting switch includes:

a first terminal part supported at a first housing side; and a second terminal part supported at a second housing side;

wherein, by sliding the second housing to the first position relative to the first housing, the first terminal part and the second terminal part are made conductive with each other.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DETAILED DESCRIPTION OF THE PREFERRED EMBODIMENTS

A description is given below, with reference to the FIG. 1 through FIG. 13 of embodiments of the present invention.

Although a case where the present invention is applied to a portable phone is discussed in the following embodiments, the present invention can be applied to a portable electronic device other than the portable phone, such as a PDA (personal data assistant), an audio device such as MP3, a camera, a game device, or the like.

Figure 1:
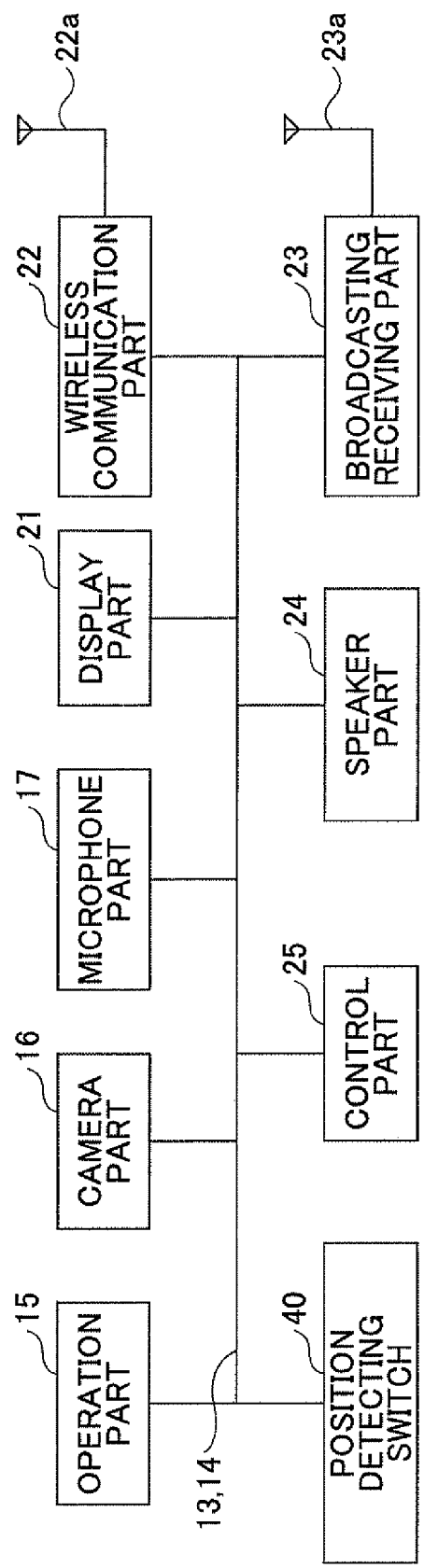
FIG. 1 is a block diagram showing a structure of a portable phone of a first embodiment of the present invention.
Figure 2:
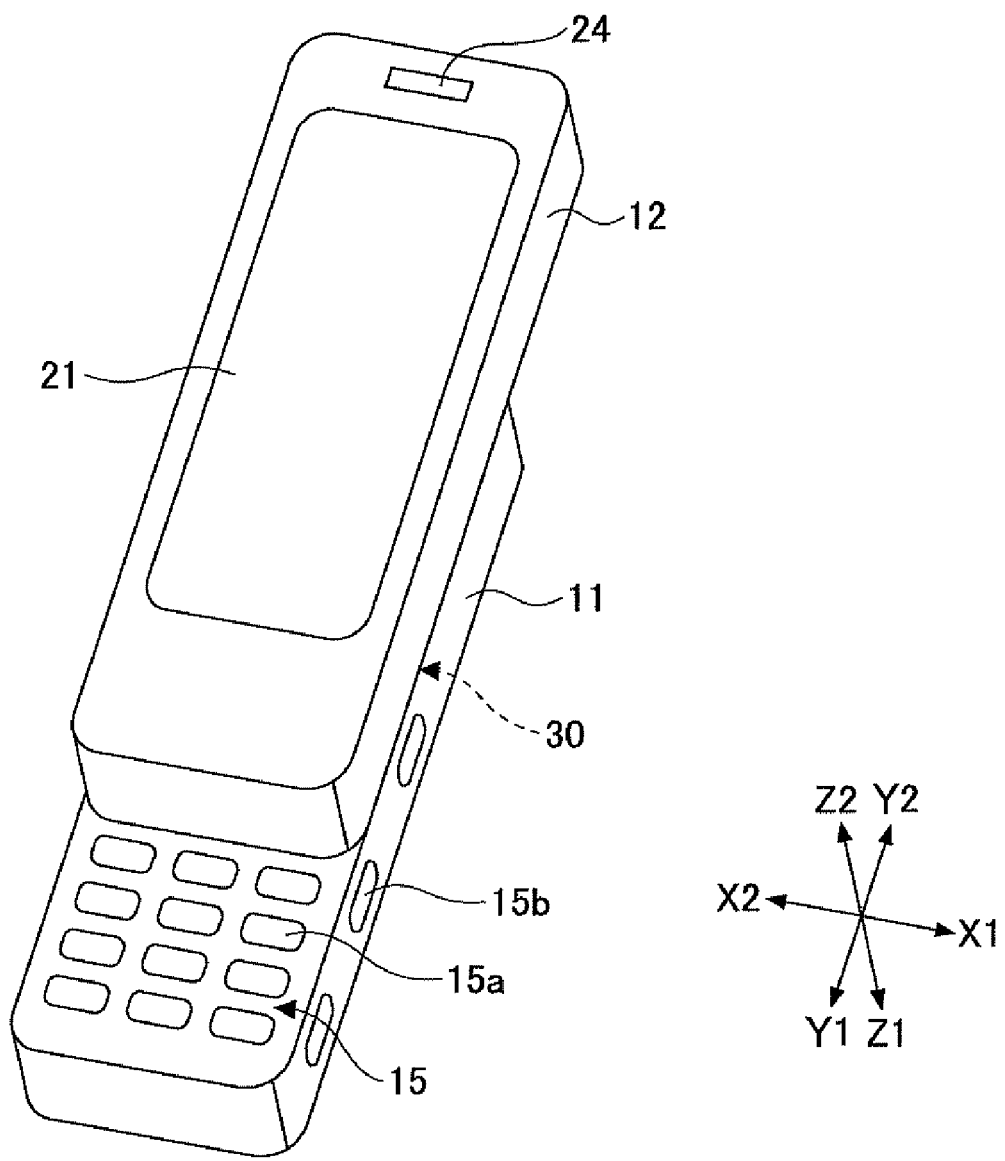
FIG. 2 is a perspective view of the portable phone in a state where a second housing 12 is situated in an opening position relative to a first housing 11.
Figure 3:
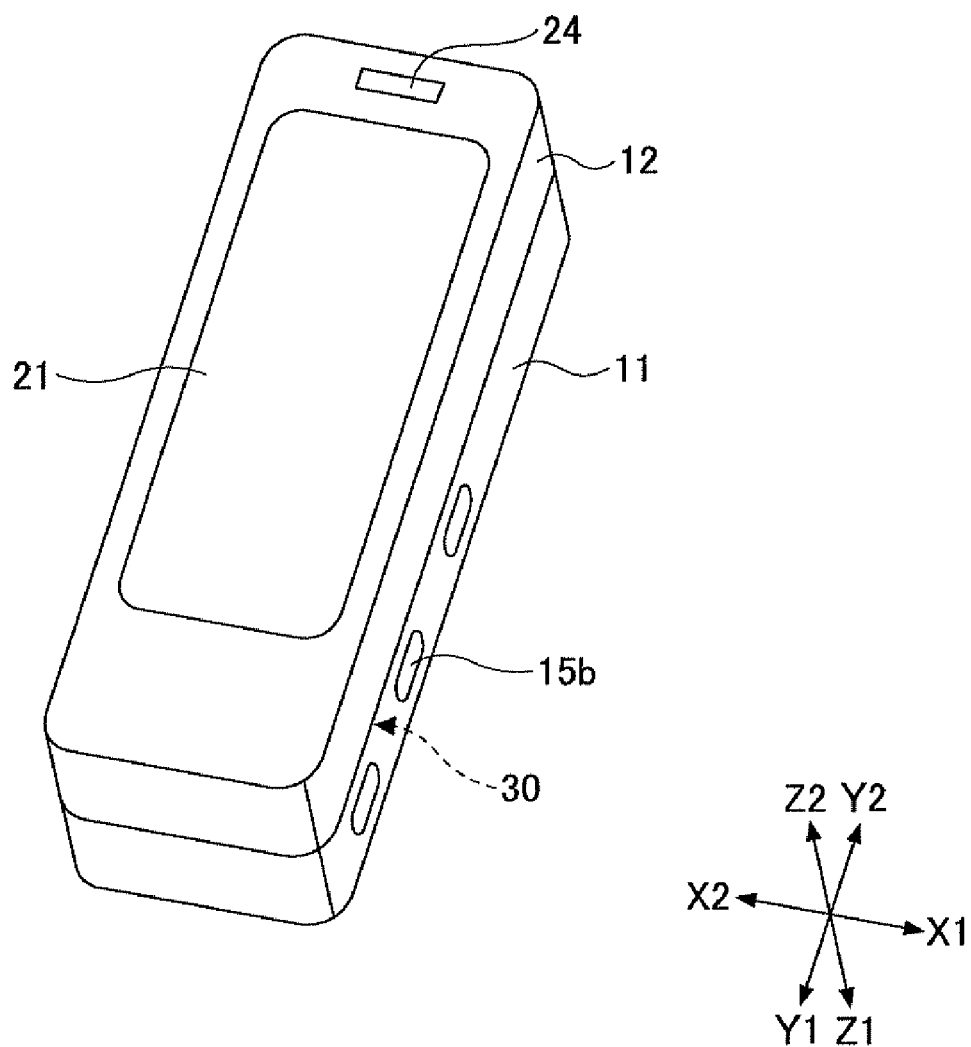
FIG. 3 is a perspective view of the portable phone in a state where the second housing 12 is situated in a closing position relative to the first housing 11.

FIG. 1 is a block diagram showing a structure of a portable phone of a first embodiment of the present invention. FIG. 2 is a perspective view of the portable phone in a state where a second housing 12 is situated in an opening position relative to a first housing 11. FIG. 3 is a perspective view of the portable phone in a state where the second housing 12 is situated in a closing position relative to the first housing 11.

The portable phone includes a communication function (calling, sending and receiving e-mails, Internet connecting, and other functions), a camera function, a television function, and other functions. The portable phone is a slide type portable phone where the first housing and the second housing 12 are slidably connected to each other.

The portable phone includes the first housing 11, the second housing 12, a first circuit board 13, a second circuit board 14, an operation part 15, a camera part 16, a microphone part 17, a display part 21, a wireless communication part 22, a broadcasting receiving part 23, a speaker part 24, a control part, 25, a slide hinge 30, and a position detecting switch 40.

The first circuit board 13 is provided in the first housing 11. The first circuit board 13 connects electrical parts provided at the first housing 11 side.

The second circuit board 14 is provided in the second housing 12. The second circuit board 14 connects electrical parts provided at the second housing 12 side. The second circuit board 14 is connected to the first circuit board 13 by a cable such as a FFC (flexible flat cable).

The operation part 15 includes plural input keys 15a provided at a front surface of the first housing 11 and plural input keys 15b provided at a side surface of the first housing 11. The operation part 15 is configured to output a signal in response to an input operation by a user.

The camera part 16 is provided at a rear surface of the first housing 11. The camera part 16 includes an imaging element such as a CCD (charge-coupled device) or a CMOS (complementary metal oxide semiconductor) device.

The microphone part 17 functions as a telephone receiver part configured to receive a voice input by the user.

The display part 21 is provided at a front surface of the second housing 12 which is a surface of an opposite side facing away from the first housing 11. The display part 21 is configured to display an image, a graphic, characters, and others. The display part 21 includes, for example, a liquid crystal display. The display part 21 may have a switch function whereby an input operation by the user can be detected based on pressure, electric capacitance, or the like. In this case, the switch function may be realized by a touch panel or the like.

The wireless communication part 22 is configured to receive and send information from and to a wireless base station via an antenna 22a. The wireless communication part 22 is provided in the second housing 12.

The speaker part 24 is configured to output voice sound.

The slide hinge (connecting mechanism) 30 is configured to slidably connect the second housing 12 to the first housing 11 between a closing position (first position) and an opening position (second position). Details of the slide hinge 30 are discussed below.

In the examples shown in FIG. 2 and FIG. 3, when the second housing 12 is slid relative to the first housing 11 to the opening position, the operation part 15 is exposed. When the second housing 12 is slid relative to the first housing 11 to the closing position, the input keys 15a of the operation part 15 are hidden. Because of this, it is possible to prevent error operation of the input keys 15a. In addition, dimensions in a longitudinal direction (Y1 and Y2 directions) of the portable phone can be shortened.

Although, in the examples shown in FIG. 2 and FIG. 3, when the second housing 12 is slid relative to the first housing 11 to the opening position, the input keys 15a of the operation part 15 are exposed, the present invention is not limited to these examples.

For example, the display part, instead of the input keys 15a, may be provided at the front surface of the first housing 11. In this case, when the second housing 12 is slid relative to the first housing 11 to the opening position, the display part is exposed. When the second housing 12 is slid relative to the first housing 11 to the closing position, the display part is hidden, and therefore the display part can be protected.

The position detecting switch 40 is configured to detect a position of the second housing 12 relative to the first housing 11. The position detecting switch 40 may output an on-signal (closing signal) when the second housing 12 is slid relative to the first housing 11 to the closing position.

The position detecting switch 40 may output another on-signal (opening signal) when the second housing 12 is slid relative to the first housing 11 to the opening position. Details of the position detecting switch 40 are discussed below.

The control part 25 is configured to control the parts of the portable electronic device so as to realize various functions of the portable electronic device. The control part 25 may be a microcomputer or the like. The control part 25 realizes various functions based on various signals from the operation part 15 and the position detecting switch 40. For example, when receiving the opening signal from the position detecting switch 40, the control part 25 displays a menu image at the display part 21. In addition, when receiving the closing signal from the position detecting switch 40, the control part 25 displays a waiting image at the display part 21 (or the display part 21 is put in a sleep mode).

Next, details of the slide hinge 30 are discussed with reference to FIG. 4 and FIG. 5.

Figure 4:
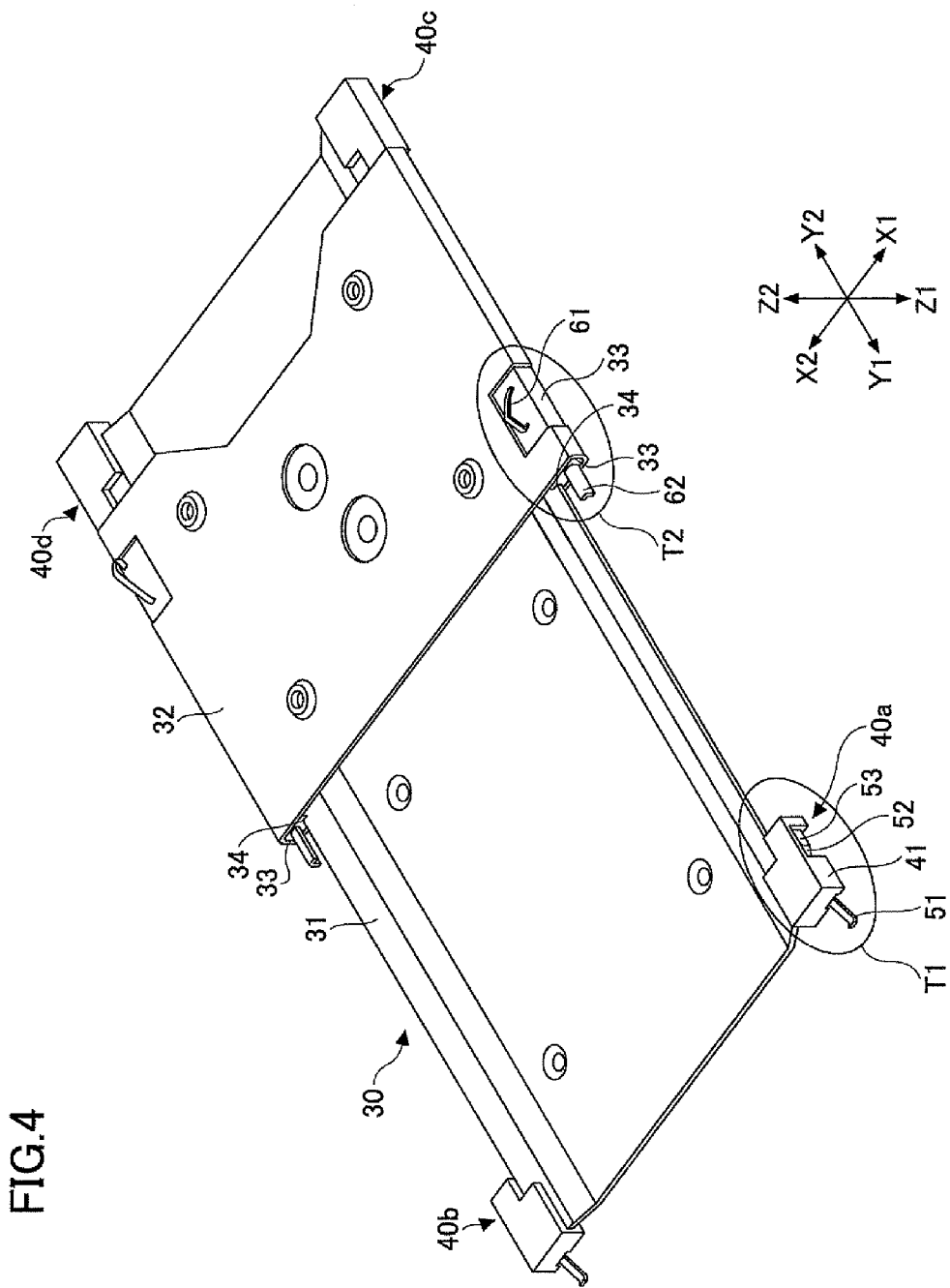
FIG. 4 is a perspective view of a slide hinge 30 of the first embodiment of the present invention in the state where the second housing 12 is situated in the opening position relative to the first housing 11.

FIG. 4 is a perspective view of a slide hinge 30 of the first embodiment of the present invention in the state where the second housing 12 (second member 32) is situated in the opening position relative to the first housing 11 (first member 31). FIG. 5 is a perspective view of the slide hinge 30 of the first embodiment of the present invention in the state where the second housing 12 (second member 32) is situated in the closing position relative to the first housing 11 (first member 31).

The slide hinge 30 includes the first member 31, the second member 32, the insulation guide member 33, and others.

The first member 31 has conductivity. The first member 31 is formed by processing a metal plate such as a SUS plate. The first member 31 is provided at the first housing 11 side. The first member 31 may be, for example, a part of a front surface of the first housing 11 (a surface part of the second housing 12 side).

The second member 32 has conductivity. The second member 32 is formed by processing a metal plate such as a SUS plate. The second member 32 is provided at the second housing 12 side. The second member 32 may be, for example, a part of a rear surface of the second housing 12 (a surface part of the first housing 11 side).

Both end parts in the width direction of the second member 32 are bent in a U-shaped manner to form respective end surfaces. The insulation guide members 33 are provided, one by one, inside the width direction bent end parts of the second member 32.

The insulation guide member 33 is configured to slidably connect the second member 32 to the first member 31 between a closing position (first position) and an opening position (second position). The insulation guide member 33 is made of resin such as POM (polyacetal) in order to ease an impact or reduce noise at the time of sliding.

Figure 5:
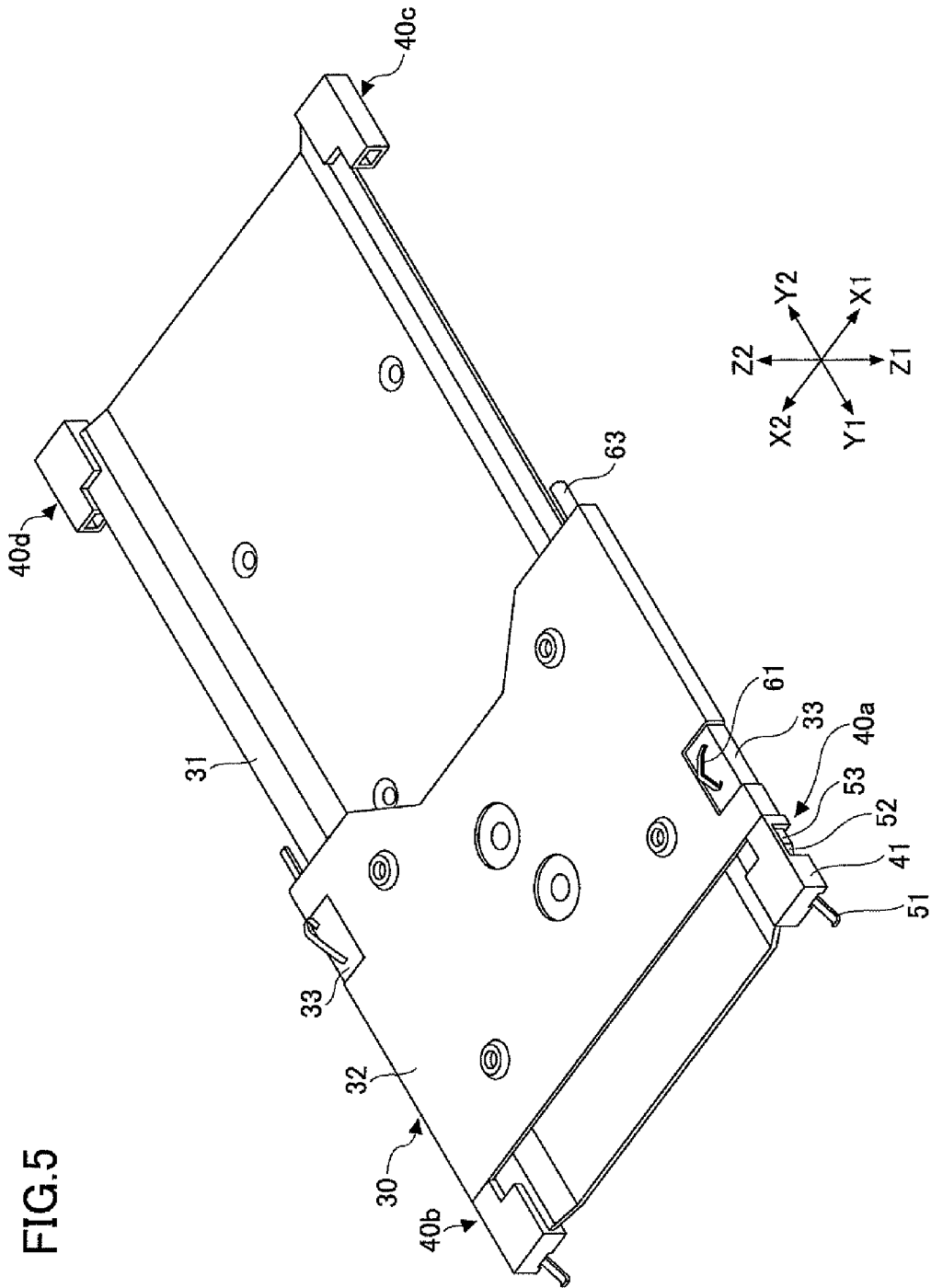
FIG. 5 is a perspective view of the slide hinge 30 of the first embodiment of the present invention in the state where the second housing 12 is situated in the closing position relative to the first housing 11.

In the examples shown in FIG. 4 and FIG. 5, guide grooves 34 are formed at inside surfaces of a pair of the insulation guide members 33. The end parts in the width direction of the first member 31 are slidably inserted in the corresponding guide grooves 34. Hence, the second member 32 can be slid in the Y1 and Y2 directions relative to the first member 31.

Next, details of the position detecting switch 40 are discussed with reference to FIG. 4 and FIG. 5.

The position detecting switch 40 is configured to detect a position of the second housing 12 (the second member 32) relative to the first housing 11 (the first member 31).

In the examples shown in FIG. 4 and FIG. 5, two of the position detecting switches 40 are provided at each of the sides in the width direction of the portable electronic device.

Among four position detecting switches 40, two position detecting switches 40a and 40b are configured to output the closing signal when the second housing 12 is slid to the closing position relative to the first housing 11. Two position detecting switches 40c and 40d are configured to output the opening signal when the second housing 12 is slid to the opening position relative to the first housing 11.

Thus, it is possible to output two kinds of signals, the opening signal and closing signal. In this specification, when it is not necessary to distinguish four position detecting switches 40a through 40d from each other, the position detecting switch is simply called the position detecting switch 40.

Although four position detecting switches 40a through 40d are provided in the examples shown in FIG. 4 and FIG. 5, any one of the position detecting switches 40 may be provided and there is no limitation of the number of the position detecting switches 40 to be provided and the combination of the position detecting switches 40.

Next, the position detecting switch 40a is discussed. Since other position detecting switches 40b through 40d have the same structures and perform the same operations, explanation thereof is omitted.

Figure 6:
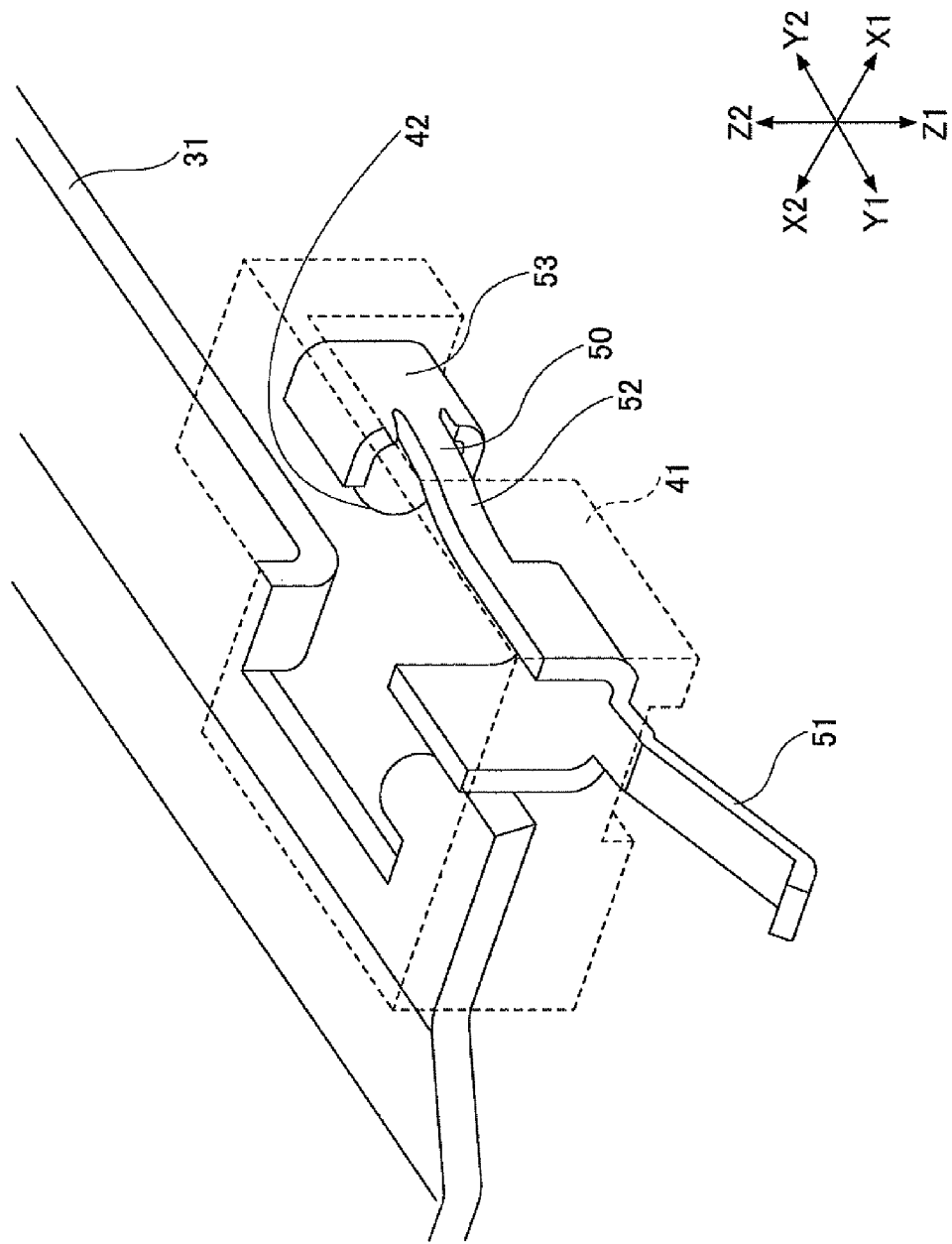
FIG. 6 is an expanded view of an area T1 shown in FIG. 4 and shows an insulation housing 41 in a perspective wire frame manner.
Figure 7:
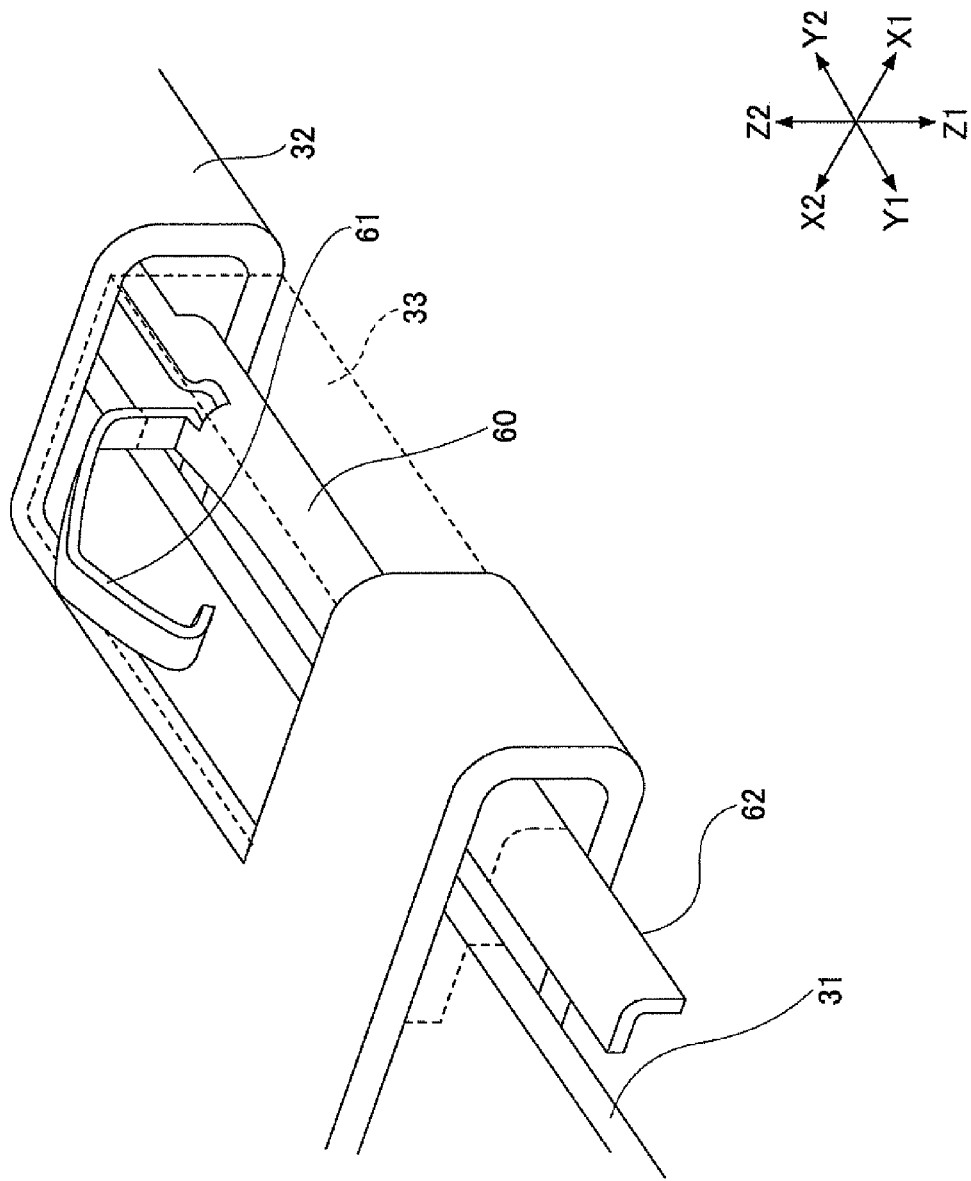
FIG. 7 is an expanded view of an area T2 shown in FIG. 4 and shows an insulation guide member 33 in a perspective wire frame manner.

The position detecting switch 40a includes a first contact 50 (see FIG. 6) and a second contact 60 (see FIG. 7). The first contact 50 is supported by the first member 31 side (the first housing 11 side). The second contact 60 is supported by the second member 32 side (the second housing 12 side).

First, the first contact 50 is discussed with reference to FIG. 6.

FIG. 6 is an expanded view of an area T1 shown in FIG. 4 and shows an insulation housing 41 in a perspective manner.

The first contact 50 has conductivity. The first contact 50 is formed by processing a metal plate such as a phosphor bronze plate. The first contact 50 is press-fitted and fixed to the insulation housing 41. The insulation housing 41 is fixed to the first member 31 so as to insulate the first member 31 from the first contact 50.

The first contact 50 has a structure where a first connecting part 51, an arm part 52, and a first terminal part 53 are formed in a body. The first connecting part 51, the arm part 52, and the first terminal part 53 are exposed or project from the insulation housing 41 and are configured to not come in contact with the first member 31.

Figure 10:
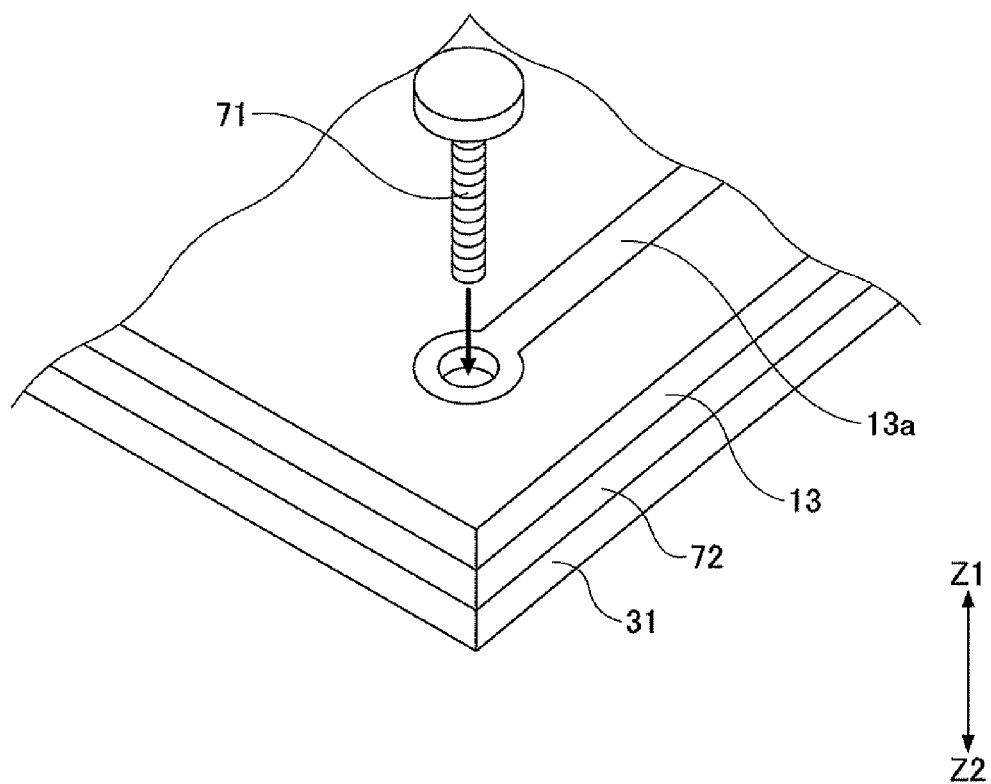
FIG. 10 is a view for explaining a relationship between a first member 31 and a first circuit board 13.

The first connecting part 51 is bent in a V-shaped manner. As shown in FIG. 10, when the first circuit board 13 is fixed to the first member 31 by a screw 71 or the like, the first connecting part 51 is pressed by a designated portion of the first circuit board 13 so as to be elastically deformed in a Z2 direction. Due to an elastic restoring force whereby this elastic deformation is cancelled, the first connecting part 51 is pressed and contacted by the designated portion of the first circuit board 13.

The arm part 52 inclines relative to the slide direction (the Y1 and Y2 directions). The arm part 52 has a structure where the first terminal part 53 side projects outside in the width direction (the X1 direction) more than the first connecting part 51 side.

In addition, when the first terminal part 53 is pressed to the width direction (the X1 direction), the arm part 52, is elastically bent with the first connecting part 51 side acting as a fulcrum.

The first terminal part 53 is bent in the U-shaped manner. A conductive ball is loosely fitted (fitted with play remaining) inside the first terminal part 53. The conductive ball 42 is prevented from being removed by the first terminal part 53, the arm part 52, and the insulation housing 41 and is insulted from the first member 31 by the insulation housing 41.

Next, the second contact 60 is discussed with reference to FIG. 7.

FIG. 7 is an expanded view of an area T2 shown in FIG. 4 and shows an insulation guide member 33 in a perspective manner.

The second contact 60 has conductivity. The second contact 60 is formed by processing a metal plate such as a phosphor bronze plate. The second contact 60 is insert-molded to the insulation guide member 33. The insulation guide member 33, as discussed above, is provided in the second member 32 so as to insulate the second member 32 from the second contact 60.

The second contact 60 includes a second connecting part 61, an end part 62 in a longitudinal direction, and another end part 63 in the longitudinal direction (see FIG. 5). The second connecting part 61, the end part 62, and the other end part 63 project from the insulation guide member 33 and are configured to not come in contact with the second member 32.

Figure 11:
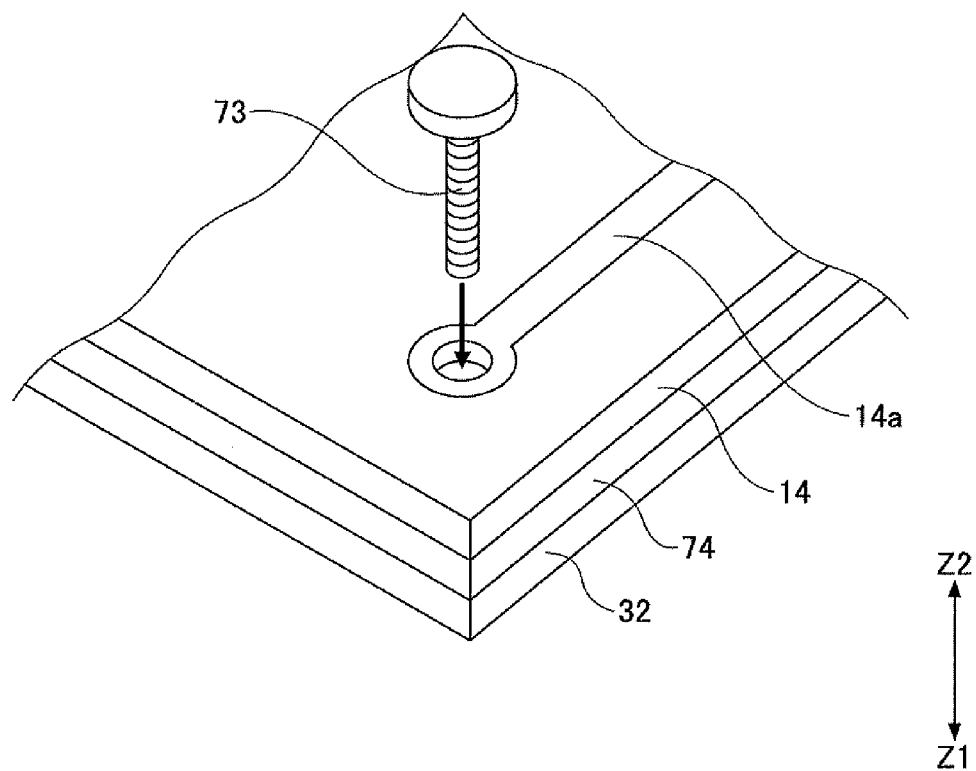
FIG. 11 is a view for explaining a relationship between a second member 32 and a second circuit board 14.

The second connecting part 61 is provided between the end part 62 and the other end part 63. The second connecting part 61 is bent in a V-shaped manner. As shown in FIG. 11, when the second circuit board 14 is fixed to the second member 32 by a screw 73 or the like, the second connecting part 61 is pressed by a designated portion of the second circuit board 14 so as to be elastically deformed in a Z1 direction. Due to an elastic restoring force whereby this elastic deformation is cancelled, the second connecting part 61 is pressed and contacted by the designated portion of the second circuit board 14.

The end part (the second terminal part) 62 has an L-shaped cross-sectional configuration. Because of this, the end part 62 has rigidity higher than that of a plane table. When the second member 31 is slid from the opening position to the closing position relative to the first member 31, the second terminal part (end part) 62 enters an inside from an inserting opening of the insulation housing 41 so as to press the conductive ball 42 in the width direction outside (X1 direction).

The other end part 63 has the same structure as the end part 62 and the same operation as the end part 62 is performed by the end part 63. The other end part 63 is a terminal part supported by the second member 32 side (the second housing 12 side) at the position of the detecting switch 40c.

Next, operation of the position detecting switch 40a is discussed.

Figure 8:
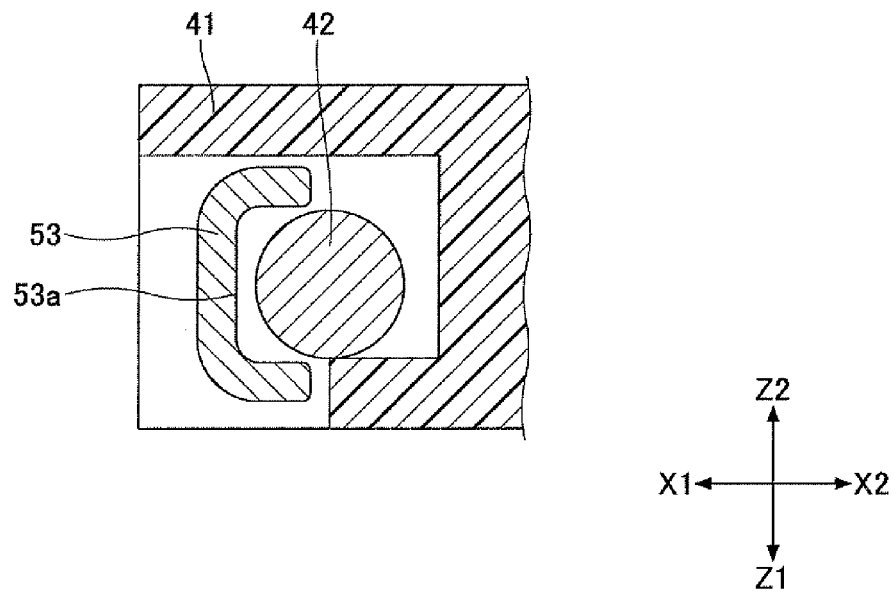
FIG. 8 is cross-sectional view of a main part of a position detecting switch 40a in the state where the second housing 12 is situated in the opening position relative to the first housing 11.
Figure 9:
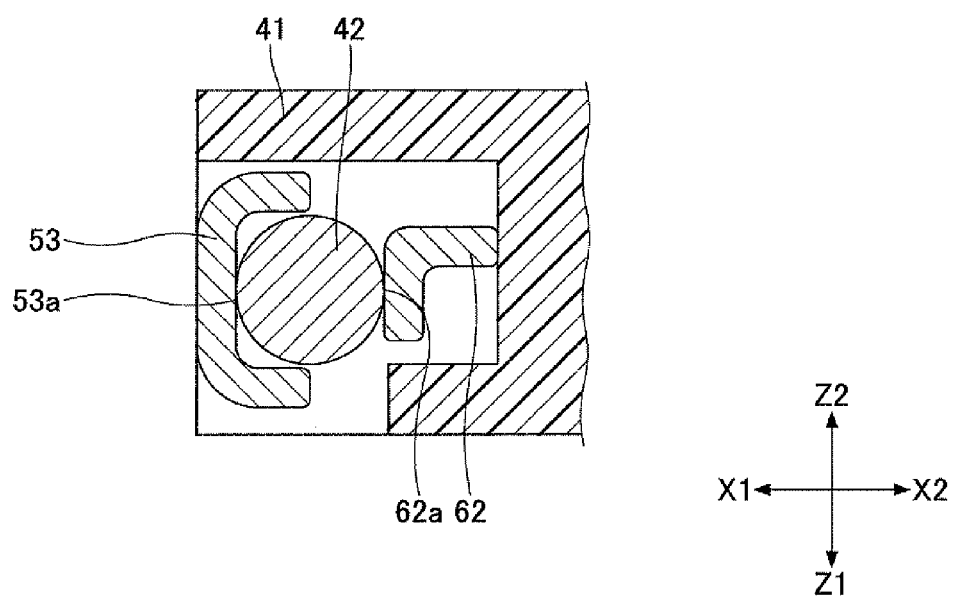
FIG. 9 is cross-sectional view of the main part of the position detecting switch 40a in the state where the second housing 12 is situated in the closing position relative to the first housing 11.

FIG. 8 is a cross-sectional view of a main part of the position detecting switch 40a in the state where the second housing 12 (the second member 32) is situated in the opening position relative to the first housing 11 (the first member 31). FIG. 9 is a cross-sectional view of the main part of the position detecting switch 40a in the state where the second housing 12 (the second member 32) is situated in the closing position relative to the first housing 11 (the first member 31).

When the second housing 12 starts being slid from the opening position to the closing position relative to the first housing 11, the second terminal part (end part) 62 supported by the second housing 12 side enters from the inserting opening of the insulation housing 41 fixed to the first housing 11 side so as to come in contact with the conductive ball 42.

As a result of this, the conductive ball 42 is pressed in the width direction outside (arrow X1 direction) so that the first terminal part 53 is pressed in the width direction outside (arrow X1 direction). Because of this, the arm part 52 is elastically deformed and the first terminal part 53 is moved in the width direction outside (arrow X1 direction).

When the first terminal part 53 is moved in the width direction outside (arrow X1 direction), while the conductive ball 42 rotates, the conductive ball 42 enters a side surface part 53a of the first terminal part 53 and a side surface part 62a of the second terminal part 62. As a result of this, the first terminal part 53 and the second terminal part 62 have conduction with each other so that the closing signal is output.

Since the first terminal part 53 supported by the first housing 11 side (the first member 31 side) and the second terminal part 62 supported by the second housing 12 side (the second member 32 side) have conduction with each other, it is possible to provide a portable electronic device whereby the consumption of electric power is low or the number of the components is small.

In addition, since the arm part 52 is elastically deformed at the time of conducting, it is possible to ease an impact at the time of sliding and improve durability.

Furthermore, the arm part 52 is elastically deformed. Therefore, due to an elastic restoring force whereby this elastic deformation is cancelled, the side surface part 53a of the first terminal part 53 is pressed and comes in contact with the conductive ball 42 so that the conductive ball 42 is pressed and comes in contact with the side surface 62a of the second terminal part 62. As a result of this, it is possible to secure conduction between the first terminal part 53 and the second terminal part 62.

Since the conductive ball 42 is rotated at the time of conducting, it is possible to ease an impact at the time of sliding and improve durability.

On the other hand, when the second housing 12 (the second member 32) starts being slid from the closing position to the opening position relative to the first housing 11 (the first member 31), the second terminal part 62 supported by the second housing 12 side comes out from the inserting opening of the insulation housing 41 fixed to the first housing 11 side so as to be separated from the conductive ball 42. As a result of this, the connection between the second terminal part 62 and the first terminal part 53 is cancelled, and the arm part 52 is elastically restored so that the first terminal part 53 returns to the original position.

As discussed above, according to the first embodiment of the present invention, since the first terminal part 53 supported by the first housing 11 side (the first member 31 side) and the second terminal part 62 supported by the second housing 12 side (the second member 32 side) have conduction with each other, it is possible to provide a portable electronic device whereby the consumption of electric power is low or the number of the components is small.

In addition, according to the first embodiment of the present invention, the arm part 52 is elastically deformed. Hence, it is possible to ease an impact at the time of sliding and improve durability. Furthermore, due to the elastic restoring force of the arm part 52, it is possible to secure conduction between the first terminal part 53 and the second terminal part 62.

Furthermore, according to the first embodiment of the present invention, since the conductive ball 42 is rotated at the time of conducting, it is possible to ease an impact at the time of sliding and improve durability.

Next, a second embodiment of the present invention is discussed. In the second embodiment of the present invention, the above-discussed position detecting switch 40 may be or may not be provided.

First, the relationship between the first member 31 and the first circuit board 13 is discussed with reference to FIG. 10.

FIG. 10 is a view for explaining a relationship between the first member 31 and the first circuit board 13.

The first member 31 functions as a ground frame of the first housing 11 side. The first member 31 is connected to a ground pattern 13a of the first circuit board 13 by a screw 71 or the like. An insulation spacer 72 is provided between the first member 31 and the first circuit board 13.

Next, the relationship between the second member 32 and the second circuit board 14 is discussed with reference to FIG. 11.

FIG. 11 is a view for explaining a relationship between the second member 32 and the second circuit board 14.

The second member 32 functions as a ground frame of the second housing 12 side. The second member 32 is connected to a ground pattern 14a of the second circuit board 14 by a screw 73 or the like. An insulation spacer 74 is provided between the second member 32 and the second circuit board 14.

Figure 12:
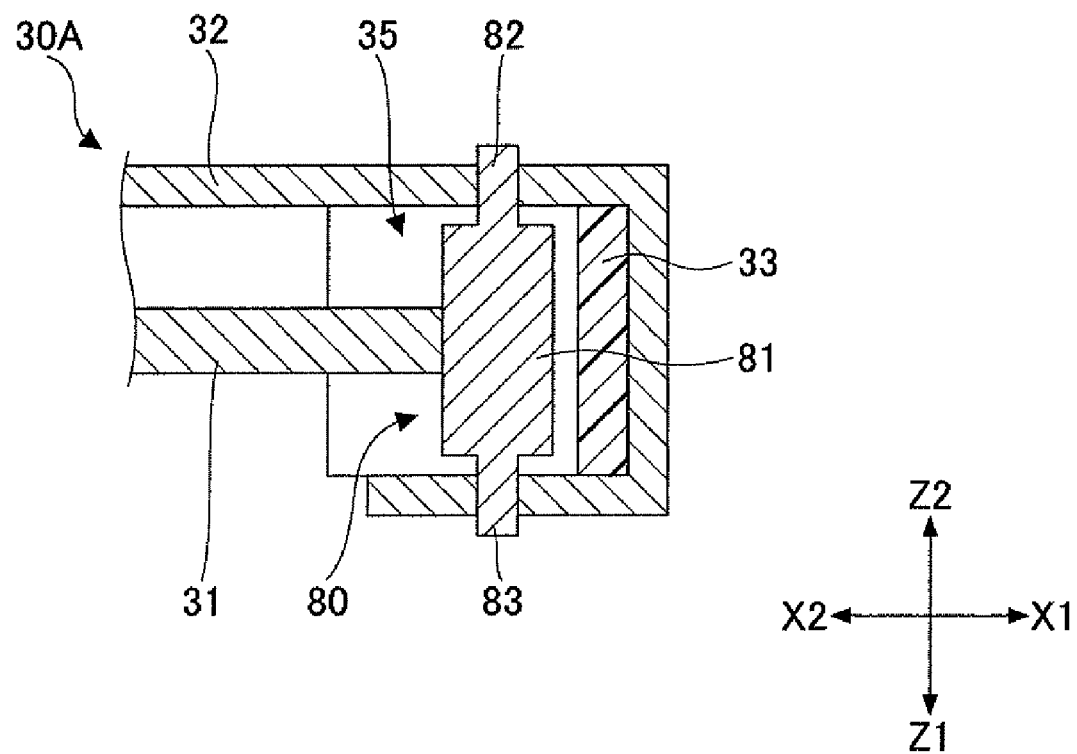
FIG. 12 is an expanded cross-sectional view of a main part of a slide hinge 30A of a second embodiment of the present invention.
Figure 13:
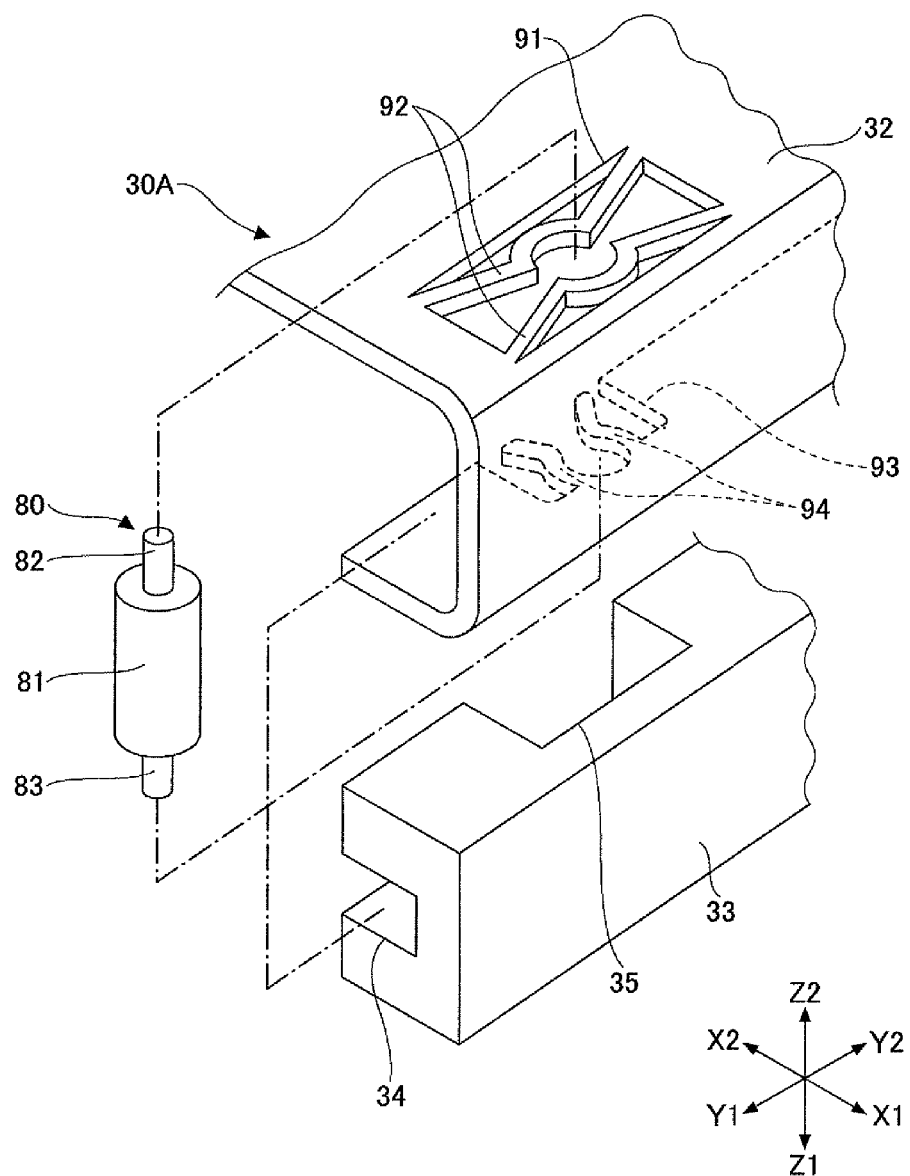
FIG. 13 is an exploded perspective view of the main part of the slide hinge 30A.

FIG. 12 is an expanded cross-sectional view of a main part of a slide hinge 30A of a second embodiment of the present invention. FIG. 13 is an exploded perspective view of the main part of the slide hinge 30A. In FIG. 12 and FIG. 13, parts that are the same as the parts shown in FIG. 1 through FIG. 9 are given the same reference numerals, and explanation thereof is omitted.

In the second embodiment of the present invention, a conducting part 80 configured to enable conduction between the first member 31 and the second member 32 is provided. With this structure, it is possible to remove the difference of electric potentials between the ground frames (first and second members) 31 and 32 and to prevent bad receiving sensitivity of the antenna 22a of the wireless communication part 22 from being generated.

In the examples shown in FIG. 12 and FIG. 13, the conducting part 80 has a structure where a roller part 81 configured to make sliding contact with the first member 31, and shaft parts 82 and 83 rotatably held against the second member 32 are formed in a body.

When the second member 32 is slid relative to the first member 31, while the roller part 81 is rotated with respect to a not-shown shaft of the roller part 81, the roller part 81 comes in contact with the first member 31. In addition, the shaft parts 82 and 83 are rotated with respect to a not shown shaft of the shaft parts 82 and 83, so that the shaft parts 82 and 83 come in contact with the second member 32.

As a result of this, regardless of the position of the second member 32 relative to the first member 31, it is possible to always have conduction between the first member 31 and the second member 32.

The conducting parts 80 may be provided at four corners of the second member 32 one by one. As a result of this, it is possible to smoothly slide the second member 32 relative to the first member 31.

In the examples shown in FIG. 12 and FIG. 13, the roller part 81 is formed in a pillar shape. The roller part 81 is rotatably received in the concave part 35 provided in the insulation guide member 33. The roller part 81 has a structure where, while the external circumferential surface of the roller part 81 slides and contacts an end surface in a width direction of the first member 31, the roller part 81 can be rotated. As a result of this, it is possible to wipe dust or the like adhered to an end surface in the width direction of the first member 31 so that bad conductivity due to the dust or the like can be prevented.

In the examples shown in FIG. 12 and FIG. 13, the roller part 81 is formed in a pillar shape. However, there is no limitation of the configuration of the roller part 81. For example, the roller part 81 may be formed in a gear shape. In this case, a rack gear configured to mesh with a pinion gear of the roller part 81 may be provided at the end surface in the width direction of the first member 31. In addition, the roller part 81 may be formed in a frustum shape. In this case, the end surface in the width direction of the first member 31 may be a tapered surface coming in contact with the external circumferential surface of the roller part 81.

The shaft parts 82 and 83 are provided coaxially with the roller part 81. The shaft parts 82 and 83 are rotatably provided at the end part in the width direction of the second member 32.

A pair of first supporting parts 92 is provided in an opening part 91 of the end part in the width direction of the second member 32. The first supporting parts 92 rotatably support the first shaft part 82. Each of the first supporting parts 91 is formed in a substantially W-shape. The first supporting parts 92 can be elastically deformed in a direction (X1 and X2 directions) perpendicular to the slide direction. The first supporting parts 92 are configured to sandwich the first shaft member 82 through arcs centered on the X1 and X2 directions.

A pair of second supporting parts 94 is provided in a notch part 93 of the end part in the width direction of the second member 32. The second supporting parts 94 rotatably support the second shaft part 83. The second supporting parts 94 can be elastically deformed in the slide direction (Y1 and Y2 directions). The second supporting parts 94 are configured to sandwich the second shaft member 83 through arcs centered on the Y1 and Y2 directions.

By press fitting the first shaft part 82 between the pair of the first supporting parts 92 and press fitting the second shaft part 83 between the pair of the second supporting parts 94, it is possible to provide the conducting part 80 to the second member 32.

As discussed above, the first shaft member 82 is sandwiched in the X1 and X2 directions perpendicular to the slide direction and the second shaft member 83 is sandwiched in the Y1 and Y2 directions which are the slide directions. Therefore, it is possible to control removal of the conducting member 80 from the second member 32.

As discussed above, according to the second embodiment of the present invention, a conducting part 80 configured to provide conduction between the first member 31 and the second member 32 is provided. With this structure, it is possible to remove the difference of electric potentials between the ground frames (first and second members) 31 and 32 and to prevent bad receiving sensitivity of the antenna 22a of the wireless communication part 22 from being generated.

Furthermore, according to the second embodiment of the present invention, based on the sliding of the second member 32 relative to the first member 31, while the roller part 81 slides and contacts an end surface in a width direction of the first member 31, the roller part is rotated. As a result of this, it is possible to wipe dust or the like adhered to an end surface in the width direction of the first member 31 so that bad conductivity due to the dust or the like can be prevented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

For example, in the first embodiment, the position detecting switches 40 are provided at the first member 31 and the second member 32 forming the slide hinge 30. However, the present invention is not limited to this structure. For example, the position detecting switches 40 may be provided at the side surface part of the first housing 11 and the side surface part of the second housing 12.

In addition, in the first embodiment, the arm part 52 is formed in a body with the first terminal part 53. However, the present invention is not limited to this structure. For example, a member corresponding to the arm part may be formed in a body with the second terminal part 62.

Furthermore, in the first embodiment, the conductive ball 42 is provided at the first housing 11 side (the first member 31 side). However, the present invention is not limited to this structure. For example, the conductive ball 42 may be provided at the second housing 12 side (the second member 32 side).

In addition, in the second embodiment, the conducting part 80 includes the roller part 81 and the shaft parts 82 and 83. However, the present invention is not limited to this structure. For example, the conducting part 80 may be formed by the conductive ball. In this case, the conductive ball may be provided between the first member 31 and the second member 32. With this structure, it is possible to always have conduction between the first member 31 and the second member 32 via the conductive ball.

Furthermore, in the second embodiment, the conducting part 80 has a structure where the roller part 81 slides and comes in contact with the first member 31 and the shaft parts 82 and 83 are rotatably provided at the second member 32. However, the present invention is not limited to this structure. For example, roller part 81 may slide and come in contact with the second member 32 and the shaft parts 82 and 83 may be rotatably provided at the first member 31.

Thus, according to the embodiments of the present invention, it is possible to provide a slide hinge, including a first member; a second member connected to the first member, the second member being configured to slide between a first position and a second position; a first terminal part supported at a first member side; and a second terminal part supported at a second member side; wherein, by sliding the second member to the first position relative to the first member, the first terminal part and the second terminal part are made conductive with each other.

According to this slide hinge, when this slide hinge is applied to the portable electronic device, the position of the second housing relative to the first housing can be detected and it is possible to provide a portable electronic device whereby the consumption of electric power is low or the number of the components is small.

The slide hinge may further include an insulation guide member configured to slidably connect the first member and the second member; and a conducting part configured to cause conduction between the first member and the second member, wherein the first member and the second member have conductivities.

According to this slide hinge, when this slide hinge is applied to the portable electronic device, it is possible to remove the difference of electric potentials between the ground frame of the first housing side and the ground frame of the second housing side.

What is claimed is:

1. A slide hinge, comprising:
a first member being connected to a ground pattern of a first circuit board;
a second member being connected to a ground pattern of a second circuit board;
wherein the second member is connected to the first member and the second member is configured to linearly slide relative to the first member between a first position and a second position;
a first terminal part supported at a first member side; and
a second terminal part supported at a second member side;
wherein, by linearly sliding the second member relative to the first member to the first position, the first terminal part and the second terminal part are made conductive with each.

2. The slide hinge as claimed in claim 1, further comprising:
an arm part formed in. a body with the first terminal part or the second terminal part, which arm part can be elastically deformed,
wherein, by linearly sliding the second member relative to the first member to the first position, the arm part is elastically deformed.

3. The slide hinge as claimed in claim 1, further comprising:
a conductive ball rotatably supported at the first member side or the second member side,
wherein by linearly sliding the second member relative to the first member to the first position, the first terminal and the second terminal are made conductive with each other via the conductive ball.

4. The slide hinge as claimed in claim 1, further comprising:
an insulation guide member configured to slidably connect the first member and the second member; and
a conducting part configured to cause conduction between the first member and the second member,
wherein the first member and the second member have conductivities.

5. The slide hinge as claimed in claim 4, wherein the conducting part includes a roller part and a shaft part;
the roller part is configured to slide and come in contact with one of the first member and the second member; and
the shaft part is formed in a body with the roller part and rotatably provided at the other of the second member and the first member.

6. The slide hinge as claimed in claim 5, wherein, based on linearly sliding of the second member relative to the first member, while the roller part slides and contacts an end surface of the first member or the second member, the roller part is rotated.

7. A portable electronic device, comprising:
a first housing having provided therein a first circuit board;
a second housing having provided therein a second circuit board;
a slide hinge including:
a first conductive member provided in a first housing side. the first conductive member being connected to a ground pattern of the first circuit board;
a second conductive member provided in a second housing side, the second conductive member being connected to a ground pattern of the second circuit board;
wherein the slide hinge connects the first housing to the second housing so that the second housing can be slid between a first position and a second position; and
a position detecting switch configured to detect a position of the second housing relative to the first housing, wherein the position detecting switch includes:
a first terminal part supported at a first housing side; and
a second terminal part supported at a second housing side;
wherein, by sliding the second housing to the first position relative to the first housing, the first terminal part and the second terminal part are made conductive with each other.

8. The portable electronic device, as claimed in claim 7, further comprising:

an arm part formed in a body with the first terminal part or the second terminal part, which arm part can be elastically deformed, wherein, by sliding the second housing to the first position relative to the first housing, the arm part is elastically deformed.

9. The portable electronic device as claimed in claim 7, further comprising:

a conductive ball rotatably supported at the first housing side or the second housing side, wherein, by sliding the second housing to the first position relative to the first housing, the first terminal part and the second terminal part are made conductive with each other via the conductive ball.

10. The portable electronic device, as claimed in claim 7, wherein the slide hinge further includes an insulation guide housing configured to slidably connect the first conductive member and the second conductive member; and a conducting part configured to cause conduction between the first conductive member and the second conductive member.

11. The portable electronic device, as claimed in claim 10, wherein the conducting part includes a roller part and a shaft part;

the roller part is configured to slide and come in contact with one of the first conductive member and the second conductive member; and the shaft part is formed in a body with the roller part and rotatably provided at the other of the second conductive member and the first member.

12. The portable electronic device, as claimed in claim 11, wherein, based on sliding of the second conductive member relative to the first conductive member, while the roller part slides and contacts an end surface of the first conductive member or the second conductive member, the roller part is rotated.

13. A portable electronic device, comprising:

a first housing;

a second housing;

a slide hinge connecting the first housing to the second housing so that the second housing can be slid relative to the first housing;

a first circuit board provided in the first housing;

a second circuit board provided in the second housing;

a first conductive member provided in the first housing;

a second conductive member provided in the second housing;

an insulation part guide configured to slidably connect the first housing and the second housing; and a conducting part configured to cause conduction between the first conductive member and the second conductive member.

* * * * *